United States Patent [19]

Gay

[11] 4,211,209
[45] Jul. 8, 1980

[54] METHOD AND APPARATUS FOR COLLECTING AND DOMESTIC USE OF SOLAR HEAT

[76] Inventor: Larry T. Gay, Rte. 1, Box 278, Frankfort, Ky. 40601

[21] Appl. No.: 862,752

[22] Filed: Dec. 21, 1977

[51] Int. Cl.² .............................................. F24J 3/02
[52] U.S. Cl. .................................. 126/422; 126/427; 126/430; 126/437
[58] Field of Search ............... 237/1 A; 126/270, 271, 126/400, 417, 427, 428, 430, 432, 435, 437; 165/159, 100, 101, 29; 137/561 A, 599, 50, 52; 239/567

[56] References Cited

U.S. PATENT DOCUMENTS

| | | | |
|---|---|---|---|
| 629,122 | 7/1899 | Davis | 126/271 |
| 1,698,561 | 1/1929 | Ransom | 122/4 R |
| 2,854,220 | 9/1958 | Vaughan | 165/159 |
| 3,239,000 | 3/1966 | Meagher | 126/271 |
| 3,254,702 | 6/1966 | Thomason | 126/271 |
| 3,261,395 | 6/1966 | Foster et al. | 165/29 |
| 3,530,881 | 9/1970 | Tanner | 137/561 R |
| 4,004,574 | 1/1977 | Barr | 237/1 A |
| 4,034,738 | 7/1977 | Barber | 237/1 A |
| 4,037,583 | 7/1977 | Bakun et al. | 126/271 |
| 4,037,785 | 7/1977 | Madern | 237/1 A |
| 4,049,194 | 9/1977 | Tice et al. | 126/271 |
| 4,108,374 | 8/1978 | Lyon et al. | 126/271 X |
| 4,121,566 | 10/1978 | Radenkovic | 237/1 A |

Primary Examiner—Ronald C. Capossela
Assistant Examiner—Henry Bennett
Attorney, Agent, or Firm—Thomas R. Morrison

[57] ABSTRACT

A solar heating system utilizing planar solar collector panels having a low specific heat fluid passing therethrough transfers the heat from the low specific heat fluid to water in a thermal storage unit using a finned heat exchanger embedded in a layer of rocks. A hot water pick-up distributor collects hot water uniformly across the top of the thermal storage unit and delivers it to a water-to-air heat exchanger through which cold return air from the structure to be heated is passed in multiple passes before going through a furnace. The furnace is operated to add heat to the air stream only when the solar heating system is incapable of providing all of the heat required. A direct-feed domestic hot water preheater is also included.

4 Claims, 4 Drawing Figures

4,211,209

METHOD AND APPARATUS FOR COLLECTING AND DOMESTIC USE OF SOLAR HEAT

BACKGROUND OF THE INVENTION

Solar heating systems conventionally are composed of solar collectors, a thermal storage unit and heat using apparatus. A heat transfer medium such as fluid, gas or air is usually circulated through the solar collectors and the heat thus gained by the material is deposited in the storage medium.

Storage media such as water tanks, dry stones and the like have conventionally been used.

In systems using hot air alone, cold return air from the building is circulated through solar panels which are exposed to sunlight. Blackened surface in the solar panels convert the solar energy into increases in ambient air temperature within the solar panels. The heated air is then circulated either to the structure to be heated or to a storage medium such as stones. During insufficient insolation to maintain the temperature of the structure at the desired level, the air from the building is circulated through the heated stones to warm it in order to overcome the temporary deficit.

In water systems, plain water may be circulated through the solar collectors and into a storage tank to heat the water resident in the storage tank. Upon demand, the heated water is drawn from the storage tank and is circulated through radiators in the building to elevate the building temperature. This system suffers from the drawback that water without anti-freeze is unsuitable in climates in which freezing can occur. Consequently, the thermal collection and thermal storage and distribution are typically separated. Thus, the solar collectors may use a non-freezing medium such as a water-glycol mixture and the heat gathered by the solar collectors deposited in a water storage tank using a heat exchanger.

SUMMARY OF THE INVENTION

The present application discloses a solar heating system in which an array of planar collector panels is assembled into a solar collector behind a transparent cover which admits a large portion of the insolation. The cover is preferably of cast acrylic due to the very good insolation transmission characteristics of that material and also because the acrylic is an excellent insulator against heat loss due to conduction through the sheet.

A fluid circulating through the solar collector is preferably a fluid having low specific heat in order to maximize the temperature differential obtained both in the collection and storage portions of the cycle. An insulated storage tank optionally containing a layer of small limestone rocks in its bottom portion has a finned heat exchanger lying upon a first layer of rocks and being covered by a second layer of rocks near the bottom of the storage unit. The rocks both aid in the thermal storage as well as in restricting the flow of cold water from the bottom of the tank to the top. This restriction tends to desireably stratify the temperature of the water in the tank to provide hotter water at the top for use and cooler water at the bottom for heat transfer thereto.

In the preferred embodiment of the invention, an inlet manifold system distributes the fluid to a plurality of collector panels in the solar collector. The inlet manifold system preferably uses copper tubing to conduct the fluid from a central inlet point to the solar collector panels. In the preferred embodiment the solar collector panels are grouped into a set nearest the center and two sets nearest the outside of the array. In order to compensate for the increased flow friction in the fluid which flows to the two outside sets, less panels are fed by the branches of the inlet manifold system going to the outside sets than to the center set. For example, the center set may contain four panels and each of the two outside sets may contain three panels.

The entire inlet manifold system is preferably contained within the solar collector and exposed to solar energy. The manifold system is preferably coated with a solar absorbing coating such as a black non-reflecting material in order that this part of the system may also contribute to collecting solar energy.

An outlet manifold system collects the fluid from the collector panels and combines it into a single solar heated outlet conduit. The outlet manifold system is similarly preferably included within the solar collector and exposed to insolation and coated to improve its absorption of insolation so that it too may contribute to the collection of solar energy.

A sump is preferably included in the line leading to the solar collector. The sump provides sufficient capacity to store all of the fluid normally circulated through the solar collector when the solar collector is opened for maintenance.

A control system compares the temperature of the fluid in the solar collectors with the temperature of the water in the storage tank. When the temperature difference between these becomes great enough, a pump is started to begin transferring the heated fluid from the solar collector to the storage tank.

When it is desired to use the stored heat, hot water is drawn off from the top of the storage tank through a hot water pick up distributor which picks up hot water uniformly across the top of the storage tank. By picking up water uniformly across the storage tank, the minimum turbulence and overturning of the water in the storage tank is achieved. Consequently, the desirable temperature stratification within the storage tank is maintained with the hotter water on top and the cooler water on the bottom. The coolness of the water on the bottom improves the thermal efficiency of the heat transfer from the heat exchanger, and the high temperature of the water on the top improves the efficiency of the space heater.

The hot water from the hot water pick up distributor is pumped to a water-to-air heat exchanger located in the cold air return of a hot air furnace. A plemun closely fits the sides of a finned water-to-air heat exchanger and a plurality of baffles alternating at top and bottom of the heat exchanger force the air at low velocity through a plurality of passes completely through the heat exchanger. The relatively low air velocity, long residence time and the multiple passes of the air through the heat exchanger enables very great transfer efficiency of the heat from the water to the cold return air. This permits satisfactory operation of the system down to water temperatures as low as 76° F. or lower.

The cold return air, preheated by the water-to-air heat exchanger passes through the furnace and is delivered to the hot air outlet of the heating system. When the solar heating system is capable of providing all of the heat demanded by the structure, a control system keeps the heating portion of the furnace in the off condition. Consequently, the furnace acts merely as a conduit for the heated air. When the solar heating system is incapable of maintaining the structure at the desired temperature, the furnace adds additional heat to the prewarmed air to achieve the desired structure temperature.

Alternatively, the warmed air from the water-to-air heat exchanger may bypass the furnace when the solar heating system is capable of maintaining the building temperature by itself. In which case a duct system is opened to provide passage of the preheated air through the furnace only during the time that the additional heat from the furnace is required.

A solar heating system according to the present disclosure was constructed and operated in Frankfort, Kentucky. The following example outlines the performance of the system over an entire winter and for nine specific days of which eight days were consecutive.

EXAMPLE

| Location | Frankfort, Kentucky |
|---|---|
| Building Type | Residential |
| Building Size | 2000 sq. ft. floor area |
| Building interior temperature | Maintained at 70° F. |
| Solar Collector Area | 233 sq. ft. |
| Coating on Solar Collector | Dishler Black K 67B39 |
| Fluid flow rate through solar collectors | 1 GPM per panel 10 GPM total flow |
| Solar Collector Cover | Cast acrylic 0.125 inch thick |
| Solar Collector Insulation | 2 inch thick glass fibers J-M-814 Series Spin behind collector panels |
| Solar Collector Frame | Northern white clear cedar |
| Thermal Storage Unit | Steel tank 1000 gallons |
| Heat Exchanger | 200 ft. slant-fin hot water coils |
| Limestone rock | 2 tons, 2 inch limestone |
| Water-to-air heat exchanger | 148 ft., 1 inch copper slant fin normal hot water heat exchanger baffled for five passes of air. Minimum useful water temperature 76° F. |
| Air Flow rate | 1100 cu. ft. per minute |
| Performance | supplied 62% of energy required to heat building |

| THERMAL COLLECTION TEST DATA | | | |
|---|---|---|---|
| | | OUTSIDE TEMPERATURE | |
| DAY | ENERGY STORED* | DAY | NIGHT |
| 1 | 136,000 B.T.U. | | |
| 2 | 170,000 B.T.U. | | |
| 3 | 136,000 B.T.U. | 39° | 26° |
| 4 | 119,000 B.T.U. | 36° | 28° |
| 5 | 170,000 B.T.U. | 36° | 30° |
| 6 | 187,000 B.T.U. | 39° | 32° |
| 7 | 136,000 B.T.U. | | |
| 8 | 170,000 B.T.U. | 42° | 38° |
| 9 | 170,000 B.T.U. | 45° | 39° |

Total heat stored 9 days 1,394,000 B.T.U.
*In excess of heat used to maintain temperature in structure

DETAILED DESCRIPTION OF THE PREFERRED EMBODIMENT

Figure 1:
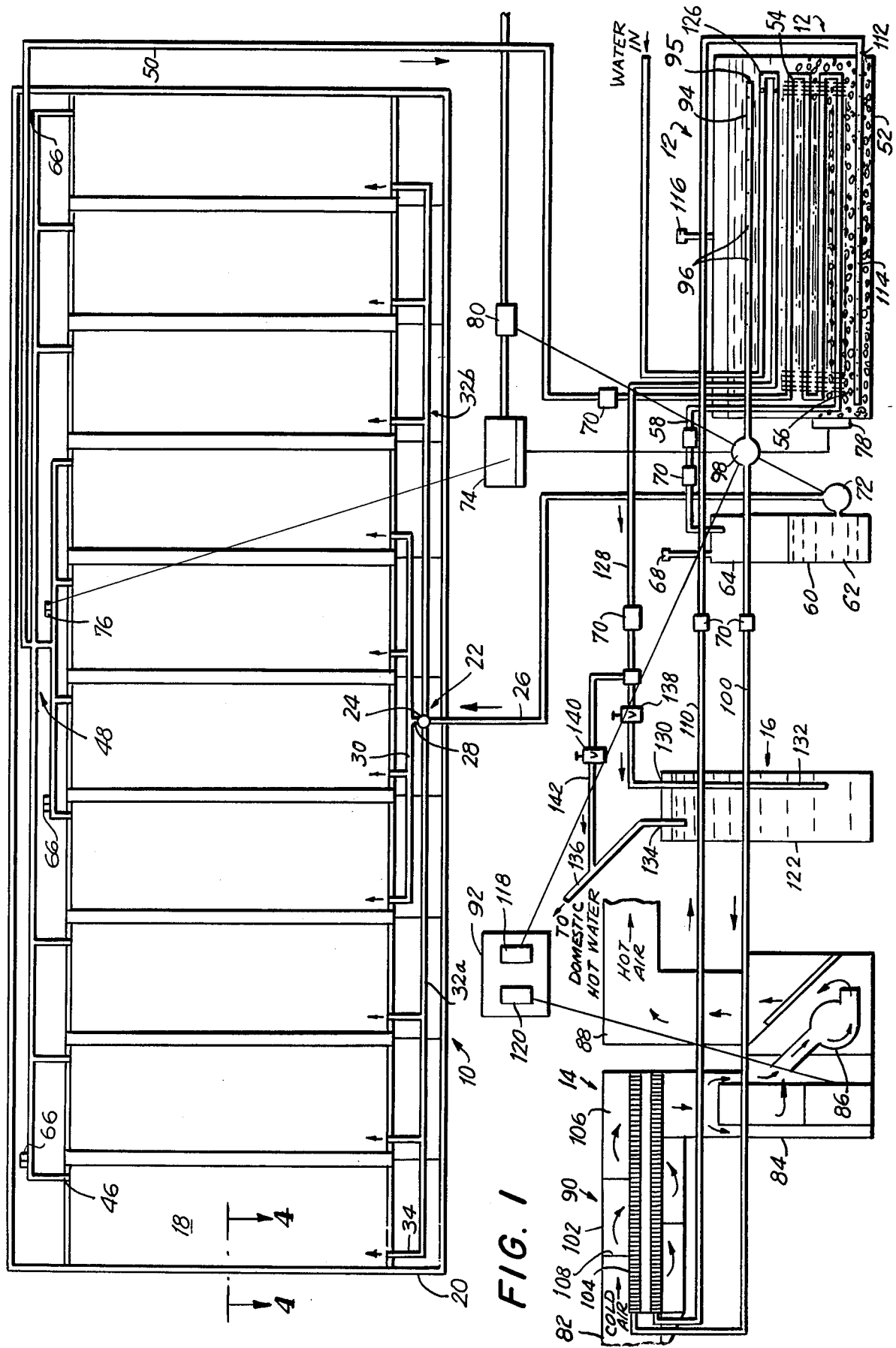
FIG. 1 shows a schematic view of the thermal system according to the present disclosure.

Referring now to FIG. 1 the preferred embodiment of the present invention uses a solar collector shown generally at 10 which is positioned to collect solar energy from the sun (not shown). The solar energy collected is stored in a thermal storage unit 12. The stored thermal energy is distributed on demand to a domestic hot air system 14 and to a domestic hot water system 16.

The solar collector 10 is made up of a plurality of collector panels 18 arrayed generally in a plane within a collector panel framework 20.

The collector panels may be made of any convenient material, but are preferably sheets of copper, brass or aluminum which have fluid flow channels in thermal contact therewith. For improved acceptance of insolation, the outer surface of the collector panels 18 are preferably treated with a low sheen coating of dark, preferably black, material. A coating of Deshler Black K67B39 material commercially available has been found satisfactory due to its resistance to high temperature, corrosion and weather.

The collector panels 18 are preferably formed of two sheets of copper or aluminum bonded together in a pattern with areas defining channels therebetween unbonded. The unbonded channels are expanded to create flow passages (not shown) through which heat-absorbing fluids such as water, glycol, or other heat transferring fluids may be circulated.

A plurality of collector panels 18 are preferably disposed in a plane. A manifold system 22 distributes the heat transferring fluid substantially uniformly to the collector panels. A distribution manifold 24 receives the incoming cold fluid from a supply conduit 26.

The distribution manifold 24 is centrally located within the collector panel framework; being closer to the center collector panels 18 than to those at the edges. A central supply conduit 28 feeds a central distribution manifold 30. Left and right distribution manifolds 32a and 32b respectively branch from the left and right respectively of the distribution manifold 24.

In the preferred embodiment shown in FIG. 1, ten collector panels 18 are placed side-by-side. These collector panels 18 may be of any convenient dimension, but economy of manufacture and assembly is aided by relatively large panel areas. In one embodiment reduced to practice, a set of rectangular collector panels 18 about 8 feet long and 3 feet wide were assembled side-by-side into a collector panel framework 20. The total area of the array of collector panels 18 was about 233 square feet.

The left and right distribution manifolds 32a, 32b feed a smaller number of collector panels 18 than does the central distribution manifold 30. Since the central distribution manifold 30 has a shorter pipe run from the distribution manifold than do the left and right distribution manifolds 32a, 32b, the fluid friction encountered in feeding through the central distribution manifold is less than the fluid friction encountered in feeding through the left and right distribution manifolds 32a, 32b. It was found that, with the dimensions noted in the preceding, four collector panels 18 could be fed from the central distribution manifold 30 and three collector panels 18 could be fed from each of the left and right distribution manifolds 32a, 32b while achieving substantially uniform flow through each of the collector panels 18. A flow rate of approximately 1 gallon per minute per collector panel 18 was achieved with the manifold system illustrated. In order to reduce the problems of erosion and corrosion due to the flow of fluid in the collector panels 18, it is preferable that the maximum flow velocity through the channels in the collector panels 18 be limited to 2 feet per second.

Figure 2:
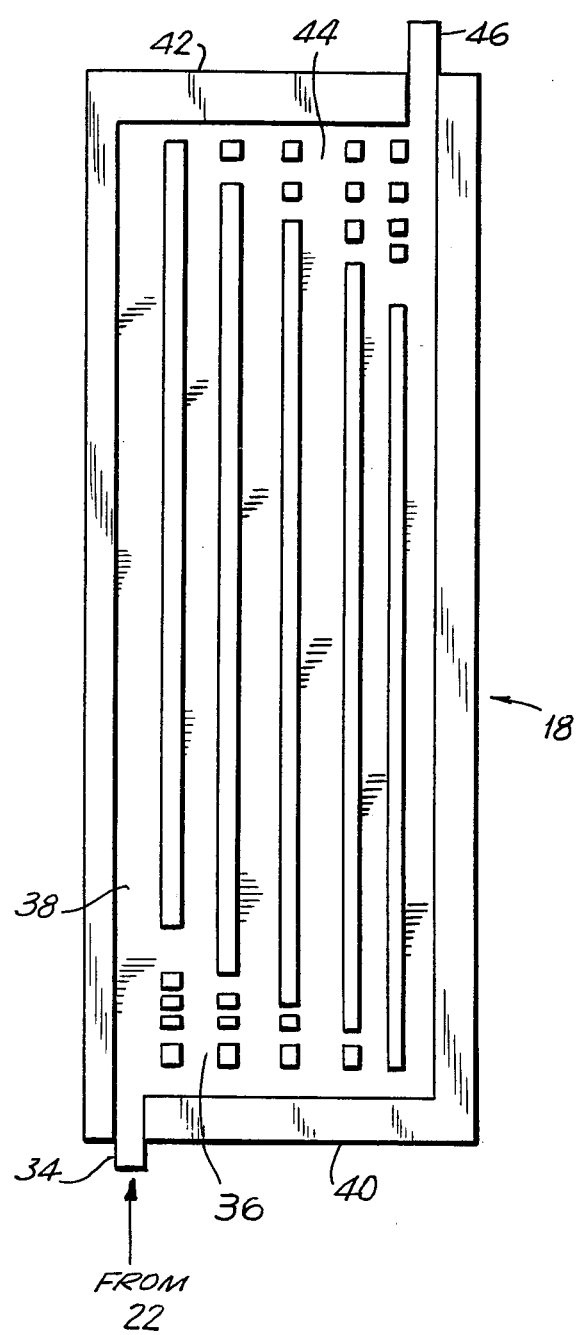
FIG. 2 shows one of the solar collector panels.

The fluid flow channels in the collector panels 18 may be arranged in serpentine flow either vertically or horizontally but are preferably arranged for uni-directional flow from bottom to top in order to maximize the heat transfer from the collector panels 18 to the fluid within the panels. One panel embodiment which provides unidirectional flow is shown generally in FIG. 2. The fluid flow from the manifold system 22 enters the panel 18 at an inlet fitting 34 and enters a panel inlet manifold 36 which distributes the relatively cold incoming fluid to a set of generally parallel channels 38 which run in the long dimension of the collector panel 18 from the lower edge 40 toward the upper edge 42 of the collector panel 18. At the top of the channels 38, the fluid is collected in a panel outlet manifold 44 and delivered through an outlet fitting 46.

An outlet manifold system 48 receives the heated fluid from all outlet fittings 46 and combines the flow into a single solar heated outlet conduit 50.

The solar heated outlet conduit 50 is connected to the thermal storage unit 12. The thermal storage unit 12 is enclosed in a storage container 52 which may be of any convenient size for the thermal requirements of the installation. In the prototype system reduced to practice, the storage container 52 was a 1000 gallon steel tank. A layer of insulation, not shown, about the storage container 52 is preferred in order to avoid loss of heat during storage. The insulation may be of any suitable material such as cellulosic fibers, glass fibers or asbestos. A storage container 52 of concrete or other suitable material may be substituted for the steel tank without departing from the spirit of the present invention.

The solar heated outlet conduit 50 is connected to a heat exchanger 54 which occupies the lower intermediate region of the storage container 52. The heat exchanger 54 is preferably a finned serpentined coil as shown in the figure. A heat exchanger of 200 feet of 1-inch copper slant-fin hot water coil was found satisfactory for transferring the heat from a ten-unit solar collector 10. The heat exchanger 54 is preferably a rectangular planar unit which is shown on edge for clarifying the figure but is in fact installed horizontally in the storage container.

A layer of limestone rock 56 is placed in the bottom of the storage container 52. The heat exchanger 54 rests upon the limestone rock 56 and is thereby elevated from the bottom of the storage container. A layer of limestone rock may also be added on top of the heat exchanger 54. The layer of limestone rock 56 below the heat exchanger 54 effectively elevates the heat exchanger 54 above the bottom of the storage container. As will be explained, the limestone rock also helps maintain stratification of the colder return water and the heated water above.

A 6 inch deep layer of porous material, preferably limestone rock 56, was employed to elevated the heat exchanger 54 above the bottom of the storage container 52. A total of two tons of limestone rock crushed to an average size of 2 inches was used. Substitution of other kind or size or rock, the use of sand, cinders, slag, metallic lumps or any other agglomerate, or a solid porous body such as concrete made with a cinder aggregate, or large bodies of porous lava or elimination of the porous material from the storage container, would not depart from the spirit of the present invention.

A solar heated return flow conduit 58 is connected from the discharge side of the heat exchanger 54 to a fluid sump 60. The lower portion 62 of the fluid sump 60 is filled with fluid. An upper portion 64 is empty under normal conditions. The upper portion 64 has enough capacity to contain all of the fluid normally residing in the solar collector 10 and the inlet and outlet manifold systems 22, 48. This allows maintenance to be performed on the solar collector 10 or the manifold systems 22, 48 by simply opening appropriate vents, for example vents 66 at the highest points in the outlet manifold system 48 thereupon allowing air to enter the solar collector 10 and displace the fluid therein. Fluid is thus permitted to drain into the upper portion 64 of the fluid sump 60. A normally open vent 68 in the top of the fluid sump 60 allows the escape of air over the upper portion 64 and to avoid pressurization of the system due to thermal expansion or other causes.

A normally closed vent may be substituted for a normally open vent 68 in order to achieve a closed or pressurized system.

The solar heated outlet conduit 50 and the solar heated return flow conduit 58 each contain an electrically non-conducting section 70. The electrically non-conducting sections may be natural or synthetic rubber tube or plastic tubing. Alternatively the conduits 50 and 58 themselves may be made of electrically non-conducting material such as plastic thereby eliminating the necessity for the electrically non-conducting section 70. The presence of the electrically non-conductive sections isolates the storage container 52 from possible hazard due to lightning strikes in the solar collector 10 or its piping.

A pump 72 circulates the fluid from the lower portion 62 of the fluid sump 60 into the supply conduit 26 and thence to the inlet manifold system 22 as previously described.

The pump 72 and thus the solar collection function is controlled by a controller 74. The controller receives temperature signals from a solar collector sensor 76 and from a thermal storage unit sensor 78. The solar collector sensor 76 is located near the top of the collector panels 18 and is preferably located in the outlet manifold system 48 close to the collector panels. The solar collector sensor 76 consequently is exposed to the highest fluid temperature in the solar collector.

The thermal storage unit sensor 78 is located in the storage container 52 at approximately the level of the heat exchanger 54.

When the temperature sensed at the solar collector sensor 76 exceeds the temperature senses at the thermal storage unit sensor 78 by a predetermined amount, the controller 74 generates a signal which starts and runs the pump 72. This causes a flow of heat absorbing fluid through the solar collectors and into the heat exchanger 54.

When the temperature difference detected by the two sensors becomes less than a predetermined amount, the controller 74 shuts off the pump 72.

An electrical relay 80 may be employed to control the pump 72 upon command signals generated by the controller 74 in order to avoid the necessity for the controller to handle the pump current directly.

The following paragraphs describe the utilization of the stored heat in the domestic hot air system 14.

The parts of the domestic hot air system 14 which are pertinent to the present invention include a cold air return 82, a furnace 84, a blower 86, a hot air conduit 88, a stored heat supply system indicated generally at 90 and a dual temperature thermostat 92.

A hot water pick-up distributor 94 extends completely across the top of the storage container 52 in the hottest water contained therein. The hot water pick-up distributor is preferably a tube plugged at its distal end 95 containing a plurality of pick-up holes 96 uniformly distributed along its entire length. The pick-up holes are small with respect to the diameter of the tube, and consequently are effective to take up hot water uniformly across the entire length of the storage container 52. This ensures that only the hottest water and all of the hottest water in the storage container 52 is removed during the heating cycle.

A pump 98, controlled by the dual temperature thermostat 92 as will be described, pumps the heated water from the storage container 52 through a hot water conduit 100 to an air heat exchanger 102 located in the cold air return 82 to the furnace 84.

By locating the air heat exchanger 102 in the cold air return 82, the greatest temperature differential between the air and the fluid is achieved. This is preferred to placing the air heat exchanger 102 in the hot air outlet 88 especially during auxiliary operation of the furnace 84. During operation of the furnace, the temperature differential between the hot air and the fluid may be very small or in fact negative. When the temperature difference is very small, the heat transfer efficiency is markedly decreased.

The air heat exchanger 102 contains a finned coil 104. The finned coil 104 is generally rectangular in shape and is disposed with its long dimension parallel to the flow of cold air from the cold air return 82 and with its fins normal to the flow of cold air. The sides of the finned coil 104 are sealed to the plenum 106 and a plurality of baffles 108 alternating between top side and bottom side of the finned coil 104 divert the flow of cold air in multiple passes through the finned coil.

The multiple passes of the cold air through the air heat exchanger 102 enables the heat exchanger to transfer a large amount of heat even with relatively small temperature differential between the cold air and the hot water. The cold air is preferably forced to pass through the finned coil at least twice and preferably five times in its passage from the cold air return 82 to the furnace 84. However, three or four passes through the finned coil 104 may be satisfactory. At each passage through the finned coil, the air temperature may be increased only two or three degrees under small temperature difference conditions. However, with multiple passes, a surprisingly large increase in air temperature is achieved. The heated air from the air heat exchanger 102 passes into the furnace 84, through the blower 86 and out the hot air conduit 88 to the domestic hot air system.

When the solar heating unit alone is capable of maintaining the temperature in the building at the desired level, the furnace 84 remains off and the entire heating task is performed by the solar heating system. When the solar heating system is unable to perform the complete heating task, the furnace 84 is controlled as will be explained to add additional heat to the warmed air entering it from the stored heat supply system 90.

A cold water return conduit 110 returns the water from the air heat exchanger 102 to the thermal storage unit 12. The cold water return conduit is connected to a cold water inlet 112 in the storage container 52. The cold water inlet is preferably located near the bottom of the storage container 52 and is located below the heat exchanger 54.

A cold water discharge distributor 114 may be connected to the cold water inlet 112 and be effective to distribute the returning cold water along the entire length of the bottom of the storage container 52. The cold water discharge distributor 114 is preferably formed similarly to the hot water pick up distributor 94 and therefore further description is not provided.

The cold water discharge distributor 114 or the cold water inlet 112 returns the cold water within the limestone rock below the heat exchanger 54.

The limestone rock 56 tends to keep the cold return water separated from the hotter water above. This segregation of cold water from hot water enables maintaining the hottest possible water temperature at the top of the storage container. The cold water is able to percolate slowly upward through the limestone rock 56 to the heat exchanger 54 and then through the heat exchanger 54 and the limestone rock above the heat exchanger to the top of the tank. The limestone rock, in addition to restricting the flow of water from bottom to top of the storage container, also stores and retains heat and thereby contributes to the thermal storage function.

In its function as a thermal storage element, the limestone rock 56 appears to give up its heat more slowly than does the water. This may tend to stabilize the performance of the solar heating system under widely varying supply and demand conditions.

Electrically non-conducting sections 70 are included in hot water conduit 100 and cold water return conduit 110 to isolate the domestic system from electrical malfunctions in the solar collector 10 or the thermal storage unit 12.

A normally open vent 116 at the top of the storage container prevents pressurization of the stored heat supply system 90.

The dual temperature thermostat 92 contains a solar heat thermostat 118 and a furnace thermostat 120. The solar heat thermostat 118 is set a few degrees higher than the furnace thermostat 120. When sufficient heat is available from the solar heating system, the solar heat thermostat operates the pump 98 and the blower 86 to supply the structure with heated air. The furnace thermostat is normally set a few degrees below the solar heat thermostat. When the heat from the solar heating system is insufficient to maintain the temperature set on the solar heat thermostat, the building temperature decreases to the triggering point of the furnace thermostat. When the furnace thermostat has triggered, the furnace 84 is turned on to add additional heat to the heated air coming from the stored heat supply system. The additional heat raises the temperature exiting the hot air conduit 88 sufficiently to maintain the temperature in the building. As long as the hot water temperature in the thermal storage unit 52 remains higher than the temperature of the cold air incoming to cold air return 82, the stored thermal energy from the solar heating system is added to the cold air before it reaches the furnace. Consequently, even when the solar heating unit is incapable of performing the entire heating task for the structure, its stored heat is utilized to reduce the energy demand from the furnace 84.

A domestic hot water system 16 is optionally provided with the solar heating system of the present invention. The domestic hot water system 16 disclosed in the drawing utilizes a conventional hot water heater tank 122 which may be heated by electricity or gas or other means not shown to the desired temperature of domestic hot water such as 140° F. Under normal wintertime conditions when the solar heating system is being used to heat the building, the solar heating system is incapable of maintaining the domestic hot water at a sufficiently high temperature. Consequently, the embodiment shown in the figure is employed to prewarm the domestic water before it enters the hot water heater tank 122 in order to reduce the energy required to raise the water temperature to the desired level.

A domestic water inlet conduit 124 provides water from the supply inlet to a domestic water preheater heat exchanger 126 which is located in the hottest water near the top of the storage container 52.

A preheated domestic water supply conduit 128 is connected between the domestic water preheater heat exchanger 126 and the supply inlet 130 to the hot water heater tank 122. A feeder pipe 132 is connected to the supply inlet 130 and directs the incoming preheated water toward the bottom of the hot water conduit 136.

When the temperature of the hottest water stored in storage container 52 is high enough to satisfy the requirements of the domestic hot water supply, the hot water heater tank 122 can be bypassed by closing valve 138 and opening bypass valve 140. Whereupon the warmed water from the domestic water preheated heat exchanger is connected by bypass conduit 142 directly to domestic hot water conduit 136 without passing through the hot water heater tank 122. Under normal summertime conditions, a domestic hot water preheater heat exchanger consisting of 30 feet of copper tubing coiled in the water in the top of the storage container is sufficient to fully provide all required domestic hot water for a residence.

It would be clear to one skilled in the art that a control system with pumps (not shown) could be used in place of the direct feed water supply to maintain the temperature in the hot water heater tank 122 at a desired temperature rather than depending merely on preheat of the inflowing water. The present disclosure has the benefit of supply simplicity and the elmination of pumps and controls, however such a more complicated system is also within the contemplation of the invention.

The fluid which circulates in the solar collector 10 and the heat exchanger 54 may be any suitable fluid which can withstand freezing temperatures and which will not excessively corrode or otherwise damage the interior conduits of the system. In a climate where freezing is not expected, plain water may be used in the solar collector. Where freezing temperatures are expected, anti-freeze mixtures of water and an anti-freeze fluid, for example, alcohol or ethylene glycol, may be utilized as the collecting fluid.

The specific heat of water is approximately 1.0 at normal ambient temperatures. In order to improve the thermal efficiency of the system, it is desirable that the maximum possible temperature differences exist at the points of heat transfer. This is due to the heat transfer relationship given in the following equation:

$$dQ/dt = \sigma(T^4 - T_o^4)$$

Where:

$T$ = absolute temperature of heat supply;
$T_o$ = absolute temperature of heat receiver
$dQ/dt$ = time rate of flow of heat;
$\sigma$ = constant which depends on whether heat transfer is radiative, convective or conductive and upon the materials involved.

The fourth power relationship of absolute temperatures causes a disproportionately large improvement in heat transfer rate to be obtained from a relatively small improvement in temperature differential. It is therefore desirable that the fluid entering the solar collector 10 be as cool as possible and the fluid leaving the solar collector 10 be as warm as possible. These objectives are best achieved by using a fluid which has a specific heat as low as possible and at most considerably less than that of water. For example, the addition of a fixed quantity of heat to a fluid which has a specific heat of 0.25 will increase its temperature four times as high as would water which has a specific heat of approximately 1.0. The use of a low specific heat fluid allows the fluid to better give up its temperature in the heat exchanger 54 and thus arrive at the solar collector 10 at a lower temperature. The low specific heat of the fluid also allows the temperature rise in the solar collector 10 to be greater. Carbon tetrachloride (C $Cl_4$) having a specific heat of approximately 0.198 may be used. Alternatively glycol $(CH_2OH)_2$ having a specific heat of 0.528 may be used. The above specific heats are found in the Handbook of Chemistry and Physics, 28th Edition, published by the Chemical Rubber Publishing Co. When a volatile fluid such as carbon tetrachloride is used, the system may have to be closed by replacing the normally open vent 68 with a spring loaded valve not shown in order to avoid loss of fluid and environmental pollution. For best results, the fluid in the solar collector 10 and the heat exchanger 54 is preferably automatic transmission fluid having a specific heat of between 0.4 and 0.8 and is most preferably of the type manufactured under the tradename Dextron. Automatic transmission fluid has a specific heat significantly lower than a water-ethylene glycol mixture and is inert, easy to handle, will not freeze at normal ambient temperatures and is non-corrosive.

Figure 3:
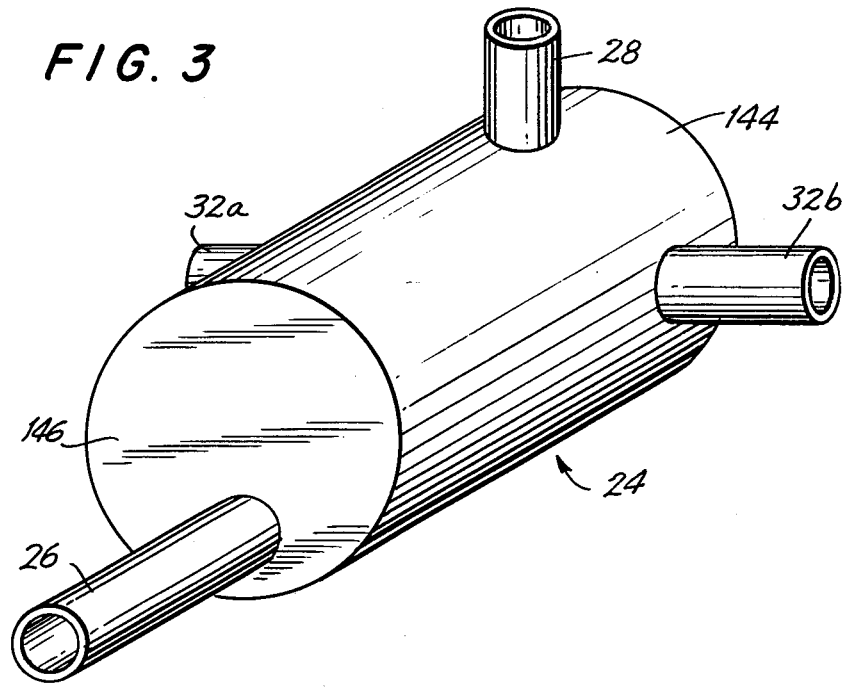
FIG. 3 shows a perspective view of the distribution manifold.

Referring now to FIG. 3, there is shown a perspective view of the distribution manifold 24. The distribution manifold 24 has a body 44 having a substantially greater cross-sectional area than the supply conduit 26. The supply conduit 26 is connected to an end plate 146 in the body 144. A second end plate, hidden by the body and consequently not shown, closes the other end of the body. The central distribution manifold 30 and the left and right distribution manifolds 32a, 32b extend outward from the body 144 at the end of the distribution manifold 24 remote from the connection point of the supply conduit 26. The supply conduit 26 is located at the lowest point of the distribution manifold 24 in order that, when the system is drained, the fluid in the collector panels will drain back through the central supply conduit 28 and the left and right distribution manifolds 32a, 32b and empty through supply conduit 26.

Figure 4:
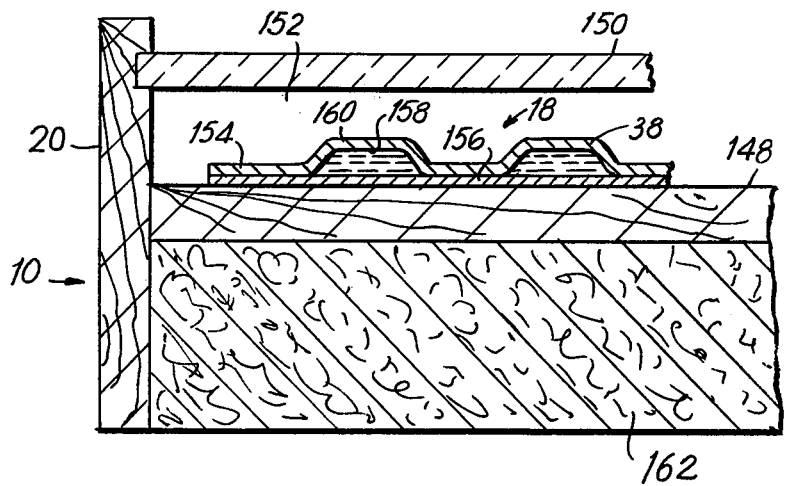
FIG. 4 shows a cross section taken along 4—4 of FIG. 1.

Referring now to FIG. 4 there is shown a cross section of a portion of the solar collector. The collector panel framework 20, preferably of lumber and most preferably of white cedar has an intermediate platform 148 mounted transversely therein. The intermediate platform 148 may be any convenient material but is preferably of wood and most preferably of plywood. The use of plywood is preferred because of the rigidity and large sizes in which this material is available and also because plywood provides reasonable insulation between its two faces.

The collector panel 18 is mounted upon the intermediate platform 148. The collector panel faces a transparent cover 150 which closes the space 152 between the intermediate platform 148 and the transparent cover 150. The transparent cover 150 is preferably of cast acrylic sheet due to the good insolation transmission and good insulation properties of this material. Single or multiple layers of transparent cover may be employed to improve the thermal retention. Alternatively, single or plural parallel layers of glass separated by air or vacuum spaces may be substituted for the transparent cover 150 without departing from the spirit of the present invention.

The collector panel 18 has a front sheet 154 bonded in a pattern to a rear sheet 156 leaving unbonded spaces 158 between the bonded regions. Both sheets are preferably of copper, aluminum or brass.

The front sheet 154 is deformed as shown away from the rear sheet 156 to create a channel 38 within which the thermal collecting fluid 160 is circulated.

In the embodiment shown, the rear sheet 156 is flat and undeformed whereas the front sheet 154 is deformed outward. In some manufacturing processes it is advantageous to deform both the front sheet 154 and the rear sheet 156 to create the channels 38.

Alternatively, the collector panel 18 may be made of a single sheet of metal with fluid channels in tubing form thermally bonded thereto.

The front surface of the front sheet is preferably coated with a thermally absorbing coating to improve the ability of the collector panel to absorb insolation.

A layer of thermal insulation 162 is located below the intermediate platform 148 to reduce the conductive heat loss from the bakc of the solar collector 10. The thermal insulation may be of any convenient type, such as open-celled or closed-celled plastic form, cellulosic fiber, or glass fibers. In the preferred embodiment, the thermal insulation 162 is a 2 inch thick batt of glass fibers identified by manufacturers numbers as J-M-814 Series Spin.

The back of the thermal insulation 162 may be left open as shown or may be closed by a sheet of material to further reduce heat loss and also to protect the relatively fragile thermal insulation. For example, a sheet of plywood or compressed fiber board of the type sold under the trademark Masonite may be attached to the solar collector panel framework 20.

The intermediate platform 148 is a convenient mounting platform upon which to mount the collector panels 18. In the preferred embodiment of the present invention, the collector panels are suspended from the collector panel framework 20 and the intermediate platform 148 is placed on the outside of the layer of thermal insulation 162. Eliminating contact between the collector panel 18 and the intermediate platform 148 prevents the possibility of charring the intermediate platform 148 due to solar heat collected by the collector panel 18 when the system is drained for maintenance.

It will be understood that the claims are intended to cover all changes and modifications of the preferred embodiments of the invention, herein chosen for the purpose of illustration which do not constitute departures from the spirit and scope of the invention.

What is claimed is:

1. A solar heating collecting and storing system comprising:
   a thermal storage tank having a top and a bottom effective to contain a heat storage liquid;
   a horizontally disposed heat exchanger elevated above said bottom;
   a body of porous material between said bottom and said heat exchanger;
   at least one solar heat collecting means for collecting solar heat;
   means for circulating a collecting liquid through said collecting means for transferring collected heat to said heat exchanger;
   pick-up distributor means horizontally disposed at the top of said heat storage liquid extending along substantially all of at least one horizontal dimension of said thermal storage tank;
   said pick-up distributor means having means for admitting said heat storage liquid uniformly along it whereby turbulence and mixing of said heat storage liquid remaining in said thermal storage tank during removal of a portion of said heat storage liquid through said pick-up distributor means is minimized;
   return means for returning said heat storage liquid to said thermal storage tank within said body of porous material below said heat exchanger, said porous body being effective to restrict the flow of heat storage liquid upward therethrough whereby turbulence and mixing of heat storage liquid due to heat storage liquid being returned by said return means is minimized;
   said return means including discharge distributor means horizontally disposed at the bottom of said thermal storage within said body of porous material extending substantially all of at least one horizontal dimension of said thermal storage tank;
   said discharge distributor means having means for discharging returned heat storage liquid uniformly along it;
   a hot air furnace having a hot air conduit and a cold air return;
   a liquid-to-air heat exchanger in said cold air return;
   means for directing cold air in said cold air return a plurality of passes through said liquid-to-air heat exchanger;
   means for passing said heat storage liquid from said pick-up distributor means through said liquid-to-air heat exchanger and for returning it to said return means whereby air returning to said hot air furnace is warmed by said liquid-to-air heat exchanger;
   first thermostat means responsive to an air temperature below a first air temperature for operating said means for passing; and
   second thermostat means responsive to an air temperature below a second air temperature lower than said first air temperature for operating said hot-air furnace to add furnace heat to the air heated by said liquid-to-air heat exchanger.

2. A system according to claim 1 further comprising:
   said at least one solar heat collecting means having a plurality of channels;
   inlet manifold means in said heat collecting means exposed to solar energy for distributing a flow of said collecting liquid substantially uniformly to said plurality of channels;

outlet manifold means in said heat collecting means exposed to solar energy for collecting fluid from said plurality of channels;

differential thermostat means having a first temperature sensor for measuring a temperature of said collecting fluid at said outlet manifold means and a second temperature sensor for measuring a temperature of said heat storage liquid at said heat exchanger and operative to actuate said means for circulating in response to a temperature difference at said first and second temperature sensors exceeding a predetermined amount.

3. A system according to claim 2, wherein said collecting liquid passes in unidirectional flow from said inlet manifold means to said outlet manifold means.

4. A system according to claim 1, wherein said collecting liquid is an automatic transmission fluid having a specific heat between about 0.4 and 0.8.

* * * * *